US008887266B2

(12) United States Patent
Liu et al.

(10) Patent No.: US 8,887,266 B2
(45) Date of Patent: Nov. 11, 2014

(54) METHOD FOR COMPUTING NETWORK REACHABILITY

(75) Inventors: Xiang-Yang A. Liu, Okemos, MI (US); Amir Khakpour, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 389 days.

(21) Appl. No.: 12/986,302

(22) Filed: Jan. 7, 2011

(65) Prior Publication Data

US 2011/0173692 A1 Jul. 14, 2011

Related U.S. Application Data

(60) Provisional application No. 61/293,349, filed on Jan. 8, 2010.

(51) Int. Cl.
*G06F 9/00* (2006.01)
*H04L 29/06* (2006.01)

(52) U.S. Cl.
CPC .......... *H04L 63/0227* (2013.01); *H04L 63/101* (2013.01); *G06F 2221/2141* (2013.01); *G06F 2221/2145* (2013.01); *G06F 2221/2149* (2013.01)
USPC ................. 726/13; 726/11; 726/12; 709/223; 709/224; 709/225; 709/226; 709/229

(58) Field of Classification Search
CPC .................................................. H01L 63/0227
USPC .......................................................... 726/13
See application file for complete search history.

(56) References Cited

U.S. PATENT DOCUMENTS

| 2006/0218280 | A1* | 9/2006 | Gouda et al. | 709/226 |
| 2006/0277601 | A1* | 12/2006 | Gouda et al. | 726/11 |
| 2006/0294577 | A1* | 12/2006 | Gouda et al. | 726/1 |
| 2007/0016946 | A1* | 1/2007 | Gouda et al. | 726/11 |

OTHER PUBLICATIONS

Alex X. Liu and Mohamed G. Gouda, "Diverse Firewall Design", IEEE, vol. 19, No. 9, Sep. 2008, pp. 1237-1251.*
Bo Zhang, T.S. Eugene Ng, and Guohui Wang, "Reachability Monitoring and Verification in Enterprise Networks," SIGCOMM'08, Aug. 17-22, 2008, pp. 1-2.*
Ehab S. Al-Shaer and Hazem H. Hamed, and DePaul University, "Modeling and Magement of Firewall Policies," IEEE second Quarter 2004, p. 2-10.*
G. Xie et al "On Static Reachability Analysis of IP Networks", INFOCOM 2005, IEEE, Mar. 2005.

* cited by examiner

*Primary Examiner* — Luu Pham
*Assistant Examiner* — Canh Le
(74) *Attorney, Agent, or Firm* — Harness, Dickey & Pierce, P.L.C.

(57) ABSTRACT

A method is provided for computing network reachability in a computer network. The method includes: identifying each of the subnetworks that comprise a computer network; determining, for each pair of subnetworks, data paths between the two subnetworks; for each identified data path, identifying access control lists implemented along a given data path and formulating a diagram that merges reachability sets derived from the access control lists along the given data path; and, deriving, for each pair of subnetworks, a set of network packets that can traverse between the subnetworks from the formulated diagrams.

26 Claims, 4 Drawing Sheets

US 8,887,266 B2

METHOD FOR COMPUTING NETWORK REACHABILITY

CROSS-REFERENCE TO RELATED APPLICATIONS

This application claims the benefit of U.S. Provisional Application No. 61/293,349, filed on Jan. 8, 2010. The entire disclosure of the above application is incorporated herein by reference.

FIELD

The present disclosure relates to a method for computing network reachability.

BACKGROUND

For security and management reasons, the reachability among hosts that are physically interconnected is often limited by Access Control Lists (ACLs), i.e., packet filters, configured on routers and firewalls. An ACL consists of a list of rules, where each rule has a predicate over some packet header fields and a decision (i.e., action) to be taken for the packets that match the predicate. The decision of a rule is typically accept (i.e., permit) or discard (i.e., deny). As a packet, may match two rules in an ACL and the two rules array have different decisions, the decision for a packet is the decision of the first, (i.e., highest priority) rule that the packets matches. Table 1 shows an example ACL.

Correctly configuring ACLs is critical as it controls the reachability of the hosts in a network. However, ACLs are difficult, to configure correctly. First, the rules in an ACL are logically entangled because of conflicts among rules and the resulting order sensitivity. Second, an ACL may consist of a large number (e.g., thousands) of rules. Third, an ACL often consists of legacy rules written by different administrators, at different times, and for different reasons. Maintaining a large number of legacy rules is difficult. Last but not least, the ACLs deployed on a network are often maintained by different administrators, and the lack of enough communication among them may contribute to the errors in individual ACLs. It has been observed that the ACLs on the Internet often have errors. An error in an ACL either creates security holes that will allow malicious traffic to sneak into a private network or blocks legitimate traffic and disrupts normal businesses, which in turn could lead to irreparable, if not tragic, consequences.

This section provides background information related to the present disclosure which is not necessarily prior art.

SUMMARY

A method is provided for computing network reachability in a computer network. The method includes: identifying each of the subnetworks that comprise a computer network; for each pair of subnetworks, determining data paths between the two subnetworks; for each identified data path, identifying access control lists implemented along a given data path and computing a diagram that merges reachability sets derived from the access control lists along the given data path; and, for each pair of subnetworks, deriving a set of network packets that can traverse between the subnetworks from the corresponding diagrams.

In one aspect of this disclosure, a method is provided for merging reachability sets derived from two or more access control lists along a given data path in a computer network. The method includes: representing each access control list in a given data path as a firewall decision diagram, converting each of the firewall decision diagrams to an equivalent firewall decision diagram, where the equivalent firewall decision diagrams are semi-isomorphic to each other; and merging the equivalent firewall decision diagrams by applying at least one of a logical AND operation or a logical OR operation to the decisions at terminals nodes of the equivalent firewall decision diagrams.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
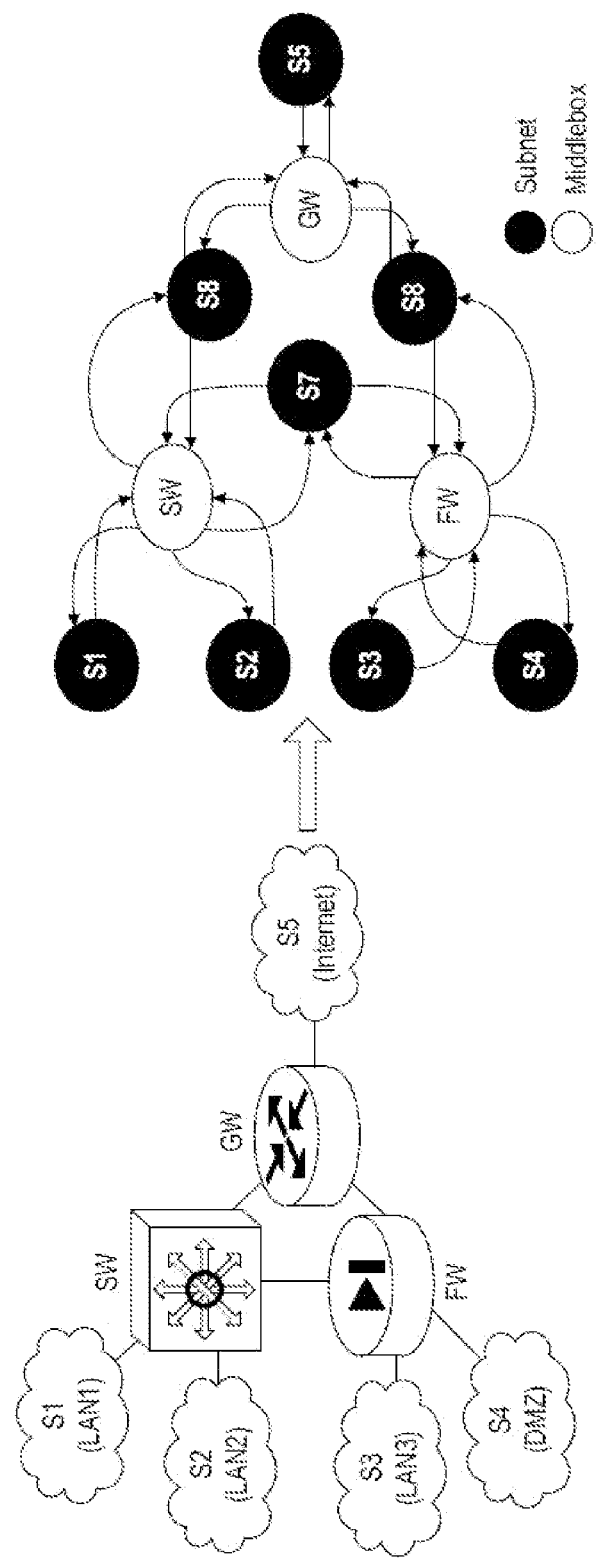
FIG. 1 is a diagram of an exemplary network topology and a graph representing the topology.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Computing network reachability is difficult. First, from the reachability perspective, the interaction among the rules in ACL is already complex due to the multi-dimensionality of ACL rules, but the interaction of multiple ACLs in interconnected networks is even more complex. Second, routing and network topology have complex impact on reachability. There is typically more than one path between a source and a destination, and a packet may only be able to traverse from the source to the destination via some, but not all, avail-able paths. Third, middleboxes often have complex impact on reachability. For example, packet transforming (such as NAT and PAT) middleboxes complicate reachability calculation because they modify packets headers when they are traveling in a network. Fourth, transport layer protocols also complicate reachability calculation because for connection-oriented protocols the reachability of both data path and signalling path should be taken into account. It is even more challenging while there are some stateful middleboxes in the path. Last, the problem space is huge as the ACL rules are typically specified over the standard 5-tuple, which have 104 bits in total.

In this disclosure, a computer-implemented tool is presented that includes a suite of concrete algorithms for computing network reachability (also referred to herein as Quarnet). The tool takes a network topology and the ACLs deployed on middleboxes as its input, and outputs reachability matrices that represent. the lower-bound reachability (i.e., the set of packets that can traverse from a source to a destination at any time), instantaneous reachability (i.e., the minimal set of packets that can traverse from a source to a destination at a particular time), and upper-bound reachability (i.e., the maximal set of packets that can traverse from a source to a destination at some time) for every pair of source and destination subnets. The tool and methods described herein may be implemented by one or more computer programs executed by one or more computer processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A network may be modeled as a non-simple directed bipartite graph G=(V, E, F), where V is a set of vertices, E is a set of arcs, and F is a set of ACLs. Each vertex in V represents a subnet or a middlebox. The term "subnet" is used to represent a set of adjacent subnetworks (i.e., local area networks (LANs) or VLANs, where either they have the same reachability (i.e., there is no ACL deployed between any two subnetworks in the set) or the reachability among the subnetworks is not a concern. For example, given an enterprise network, we represent the outside Internet as a subnet. The term "middlebox" refers to any networking device that can forward packets from one subnet to another, such as a network router, a firewall, a traffic shaper, or an L3 switch. Let N be the set of subnets in V and R be the set of middleboxes in V. Each arc in E represents a unidirectional physical link between a subset in N and a middlebox in R. Each ACL in F filters the packets traveling on an arc in E.

Network links are modeled as unidirectional arcs because every ACL is associated with a unidirectional physical link and each bidirectional link can be modeled as two unidirectional arcs. Note that some physical links, such as satellite links, are physically unidirectional. A network is modeled as a bi-partite graph because between two adjacent subnets there is at least one middlebox and between any two middleboxes there exists at least one subnet. A network is modeled as a non-simple graph because between a subnet and a middlebox there may exist multiple physical links for backup.

Given a network with m, middleboxes, where the maximum number of unidirectional interfaces on a middlebox is denoted h, we represent the network by an m×h matrix I called the Network Incident Matrix. Here I[i,j]=N if and only if subset N connects to middlebox i on its interface j, and I[i,j]=0 if and only if no subnet connects to middlebox i on its interface j. For simplicity, incoming interfaces are represented by even numbers and outgoing interfaces are represented by odd numbers. Similarly, we represent the ACLs deployed on the network by an m×h matrix A called the ACL Matrix. A[i,j] is used to denote the ACL deployed on the j-th interface of middlebox i.

FIG. 1 illustrates an exemplary network with three middleboxes and four subnetworks. Two VLANs (S1 and S2) are connected to an L3 switch (SW). One subnetwork (S3) and a DMZ (S4) are connected to Firewall (FW). SW and FW are connected to the Internet through a gateway router (GW). A graph representing the topology is also presented in the figure. Note that we assume there is an ACL on each interface of the middleboxes. The graph consists of 11 vertices representing the 8 subnets S1, . . . , S8 and the 3 middleboxes SW, FW, and GW. Note that S1, . . . , S4 denotes the four subnetworks LAN1, LAN2, LAN3, and DMZ, S5 denotes the outside Internet, and S6, . . . , S8 denotes the subnetworks that connects two adjacent middleboxes. The network incident matrix for this network with m=3 and h=8 is as follows:

$$I = \begin{pmatrix} S1 & S1 & S2 & S2 & S6 & S6 & S7 & S7 \\ S3 & S3 & S4 & S4 & S7 & S7 & S8 & S8 \\ S5 & S5 & S6 & S6 & S8 & S8 & 0 & 0 \end{pmatrix}$$

Between any two directly connected middleboxes, the model assumes there is a subnetwork because the middlebox interfaces may have a distinct IP address and an ACL guarding that interface. The reachability of such a subnetwork is important because of several reasons. First, there are often some management services on a middlebox (such as SNMP, Telnet, and SSH) that are accessible through each interface. Such services are intended to be used only by administrators. Therefore, there are often some rules in the ACL deployed on each interface to restrict the access to this subnetwork. Second, if a middlebox is compromised, the source of the subsequent attacks is the IP address of an interface of the middlebox; thus the reachability from that subnetwork to other subnetworks is critical. Indeed, if the interfaces are not assigned IP addresses, the subnet is modeled with an empty address set; henceforth, reachability to and from the subnetwork is empty.

The reachability of a network depends on not only the static factors, i.e., network topology and ACL configurations, but also the dynamic factors, i.e., routing states, where each is defined as a snapshot of all the routing tables of the middleboxes in the network, and the one-to-one mapping tables of dynamic NATs and PATs. Three types of network reachability are formulated for a given network topology and the ACL configurations: lower-bound reachability, instantaneous reachability, and upper-bound reachability. Lower-bound reachability is defined from subnet $N_i$ to $N_j$ as the set of packets that can go from $N_i$ to $N_j$ at any time. Instantaneous reachability from subnet $N_i$ to $N_j$ as the set of packets that can go from $N_i$ to $N_j$ at a particular time. Upper-bound reachability from subnet $N_i$ to $N_j$ as the set of packets that can go from $N_i$ to $N_j$ as the set of packets that can go from $N_i$ to $N_j$ at some time.

Given a network routing state s, which is a snapshot of all the routing tables of the middleboxes in the network, let $P_{i,j}(s)$ denote the path from $N_i$ to $N_j$ at state s, and M denote the number of hops/middleboxes on path $P_{i,j}(s)$. For the k-th middlebox, we use $C_{2k-1}$ to denote the ACL on the incoming middlebox interface and $C_{2k}$ to denote the ACL on the outgoing middlebox interface.

For connectionless protocols (e.g., the UDP protocol), the instantaneous reachability from $N_i$ to $N_j$, Therefore, instantaneous reachability is calculated as follows:

$$R_{CL}^I(i, j, s) = \bigcap_{k=1}^{2N} A_{UDP}(c_k) \quad (1)$$

where $A_{UDP}(C_k)$ is the set of UDP packets accepted by $C_k$.

For connection-oriented protocols (e.g., the TCP protocol), the instantaneous reachability from $N_i$ to $N_j$ also depends on the reachability of the acknowledgement (ACK) messages from $N_j$ to $N_i$. To incorporate the signaling path reachability of data path $P_{i,j}(s)$, the statefulness of the intermediate middleboxes is distinguished according to the following three cases: all middleboxes in $P_{i,j}(s)$ are stateful, all middleboxes in $P_{i,j}(s)$ are stateless, and $P_{i,j}(s)$ contains both stateful and stateless middleboxes.

In any stateful middlebox on path $P_{i,j}(s)$, the state of every TCP session is stored in a state table to ensure that the corresponding signaling messages can traverse back from $N_i$ to $N_j$. Such messages are not checked against any ACL of the middleboxes on path $P_{i,j}(s)$. When a signaling message does not match any entry in the state table of a stateful middlebox, the message is dropped and the connection will fail. Here assume that the network is designed such that path-coupled signaling on stateful firewalls and NAT, which means that the forward data path and the backward signaling path contain the same set of middleboxes. The path-coupled property holds for most existing networks. Thus, when all middleboxes in $P_{i,j}(s)$ are stateful, the instantaneous reachability from $N_i$ to $N_j$ is the intersection of the set of TCP packets accepted by every ACL on the path from $N_i$ to $N_j$. Therefore, we calculated instantaneous reachability for this case as follows, where $A_{TCP}(C_k)$ represents the set of TCP packets accepted by ACL $C_k$.

$$R_{CO}^I(i,j,s) = \bigcap_{k=1}^{2M} A_{TCP}(C_k) \qquad (2)$$

If all the intermediate middleboxes are stateless, not only need to consider the data path from $N_i$ to $N_j$, but as the signaling path from $N_j$ to $N_i$. Let $\tilde{A}$ represent the set of accepted packets where in each packet the values of source and destination IP address fields are swapped, and the values of source and destination port number fields are also swapped. Field swapping is needed because in one TCP session each data packet and its corresponding signaling packet have their IP addresses and port numbers in the opposite order. Note that when all middleboxes in $P_{i,j}(s)$ are stateless, do not need path-coupled assumption. Thus, the instantaneous reachability for the connection-oriented and reliable protocols is the intersection of the set of accepted TCP packets in the data path and the set of accepted TCP packets in the signaling path. Therefore, instantaneous reachability for this case is calculated as follows, where the classifiers on path $P_{j,i}$ consists of $C'_1, C'_2, \ldots, C'_{2M'}$. Note that $\bigcap_{k=1}^{2M} A_k \bigcap_{k=1}^{2M'} B_k \equiv A_1 \cap \ldots \cap A_{2M} \cap B_1 \cap \ldots \cap B_{2M'}$.

$$R_{CO}^I(i,j,s) = \bigcap_{k=1}^{2M} A_{TCP}(C_k) \cap \bigcap_{k=1}^{2M'} \tilde{A}_{TCP}(C'_k) \qquad (3)$$

For stateful middleboxes, an assumption of path-coupled signaling is again needed. For stateless middleboxes, do not need this assumption. Thus, the instantaneous reachability on $P_{i,j}(s)$ is the intersection of the set of accepted packets of stateful middleboxes calculated by formula (2) and the set of accepted packets of stateless routers calculated by formula (3).

The Reachability Lower-bound from $N_i$ to $N_j$, $R^L(1,j)$, denotes the set of packets that can traverse from $N_i$ to $N_j$ in all routing states. The Reachability Upper-bound from $N_i$ to $N_j$, $R^U(1,j)$, denotes the set of packets that can traverse from $N_i$ to $N_j$ in some routing states. Let S denote the set of all routing states of a network. The reachability lower-bound and upper-bound from $N_i$ to $N_j$ are calculated below:

$$R_{CL}^U(i,j) = \bigcup_{s \in S} R_{CL}^I(i,j,s) \qquad (4)$$

$$R_{CL}^L(i,j) = \bigcap_{s \in S} R_{CL}^I(i,j,s) \qquad (5)$$

Similar to the reachability bounds for connectionless protocols, the reachability bounds of the connection-oriented protocols using formulas (2) and (3) are calculated below:

$$R_{CO}^U(i,j) = \bigcup_{s \in S} R_{CO}^I(i,j,s) \qquad (6)$$

$$R_{CO}^L(i,j) = \bigcap_{s \in S} R_{CO}^I(i,j,s) \qquad (7)$$

Computing reachability lower-bound and upper-bound is very useful. For example, lower-bound reachability can be used to ensure that the available services on a subnet are reachable regardless of routing states, and upper-bound reachability can be used to ensure that the access to some services is restricted. Furthermore, the reachability upper-bound and lower-bound are useful in verifying the correctness of ACLs. Ideally, the reachability upper-bound and lower-bound from $N_i$ to $N_j$ should be the same (i.e., $\Delta R(i,j) = R^U(i,j) - R^L(i,j)$ should be 0). Otherwise, the ACLs have inconsistent decisions for the packets in $\Delta R(i,j)$: sometimes they are allowed to traverse from $N_i$ to $N_j$, and sometimes they are not. For a packet $\pi \in \Delta R(i,j)$: if $\pi$ should be constantly allowed to traverse from $N_i$ to $N_j$, then blocking $\pi$ at some routing states may disrupt legitimate services; if $\pi$ should be constantly disallowed to traverse from $N_i$ to $N_j$, then accepting $\pi$ at some states may cause security breaches.

Thus far, network reachability calculations are based on the assumption that packet header fields are not changed in the traversal from a source subnet to a destination subnet. Actually, there may be some packet transformers, such as Network Address Translation (NAT) and Port Address Translation (PAT), on the intermediate middleboxes that modify packet headers. An NAT transformer on a middlebox may change the source address field of a packet from x to x' and keep a record of this transformation in a table, which is used to change the destination field of the corresponding signaling packet from x' to x. A PAT transformer works similarly for port fields. Here, the path-coupled signaling assumption is necessary for paths that contain packet transforming filters.

Typically, a middlebox (such as a Cisco router and IP tables) applies NAT to a packet after it passes the ACL on the incoming interface and before it is sent to the ACL on the outgoing interface. Let middlebox $\gamma$ be the one on path $P_{i,j}(s)$ that uses a packet transformation (for source address or port number fields) function $T_S: N_i \rightarrow N'_i$, where $N'_i$ is the virtual subnet to which $N_i$ is mapped. $T_S^{-1}$ is used to denote the reverse function. The instantaneous reachability for connectionless protocols is calculated using formula (1) as follows:

$$R_{CL}^I(i,j,s,T_S) = \bigcap_{k=1}^{2\gamma-1} A_{UDP}(C_k) \cap T_S^{-1} \left( \bigcap_{k=2\gamma}^{2M} A_{UDP}(C_k) \right). \qquad (8)$$

Note that applying function $T_S^{-1}$ to $\bigcap_{k=2\gamma}^{2M} A_{UDP}(C_k)$ means changing the source fields of every packet in $\bigcap_{k=2\gamma}^{2M} A_{UDP}(C_k)$ from $N'_i$ to $N_i$.

The reachability bounds for connectionless protocols are calculated using formulas (4) and (5) as follows:

$$R_{CL}^U(i, j, T_S) = \bigcup_{s \in S} R_{CL}^l(i, j, s, T_S) \quad (9)$$

$$R_{CL}^L(i, j, T_S) = \bigcap_{s \in S} R_{CL}^l(i, j, s, T_S) \quad (10)$$

For connection-oriented protocols, the middlebox γ' in the signaling path (based on the path-coupled assumption). The instantaneous reachability formulation for data paths $R_{CO}^{\rightarrow}(i, j, s, T_S)$ is as follows:

$$R_{CO}^{\rightarrow}(i, j, s, T_S) = \bigcap_{k=1}^{2\gamma-1} A_{TCP}(C_k) \cap T_S^{-1}\left(\bigcap_{k=2\gamma}^{2M} A_{TCP}(C_k)\right) \quad (11)$$

Similarly, the instantaneous reachability formulation for signaling path $R_{CO}^{\leftarrow}(j, i, s, T_D)$ is as follows:

$$R_{CO}^{\leftarrow}(j, i, s, T_D) = T_D^{-1}\left(\bigcap_{k=1}^{2\gamma'-1} A_{TCP}(C_k')\right) \bigcap_{k=2\gamma'}^{2M'} A_{TCP}(C_k') \quad (12)$$

Where $T_D$ transforms the destination addresses of signaling packets from $N_i$ to $N'_i$.

Using formulas (11), (12), and (3), instantaneous reachability for connection-oriented protocols is forwarded as:

$$R_{CO}^l(i, j, s, T_S, T_D) = R_{CL}^{\rightarrow}(i, j, s, T_S) \cap \tilde{R}_{CL}^{\leftarrow}(j, i, s, T_D) \quad (13)$$

Note that formula (13) can be easily generalized to handle the paths that have multiple packet transformers.

The reachability bounds for connection-oriented protocols are formulated based on equations (6) and (7) as follows:

$$R_{CO}^U(i, j, T_S, T_D) = \bigcup_{s \in S} R_{CO}^l(i, j, s, T_S, T_D) = \quad (14)$$

$$\bigcup_{s \in S} R_{CL}^{\rightarrow}(i, j, s, T_S, T_D) \cap \bigcup_{s \in S} \tilde{R}_{CL}^{\leftarrow}(j, i, s, T_S, T_D)$$

$$R_{CO}^L(i, j, T_S, T_D) = \bigcap_{s \in S} R_{CO}^l(i, j, s, T_S, T_D) = \quad (15)$$

$$\bigcap_{s \in S} R_{CL}^{\rightarrow}(i, j, s, T_S, T_D) \bigcap_{s \in S} \tilde{R}_{CL}^{\leftarrow}(j, i, s, T_S, T_D)$$

For any ACL l, define the accept set of l, denoted accept (l), to be the set of packets that can be accepted by l. Call accept (l), the reachability set or accept set of ACL l. Prior to computing network reachability, the core problem of merging reachability sets derived from the access control lists is addressed. That is, given two ACLs $l_1$ and $l_2$, how to compute an intersection of two reachability sets (i.e., accept($l_1$)∩accept($l_2$)) and a union of two reachability sets (i.e., accept($l_1$)∪accept($l_2$)).

Figure 2:
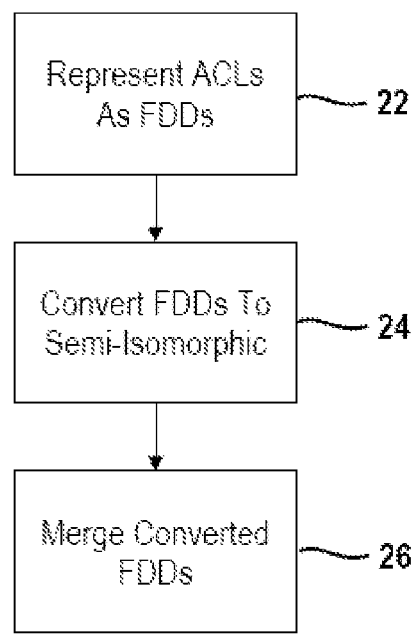
FIG. 2 is a flowchart depicting a method for merging reachability sets derived from access control lists along a given data path in a computer network.
Figure 3:
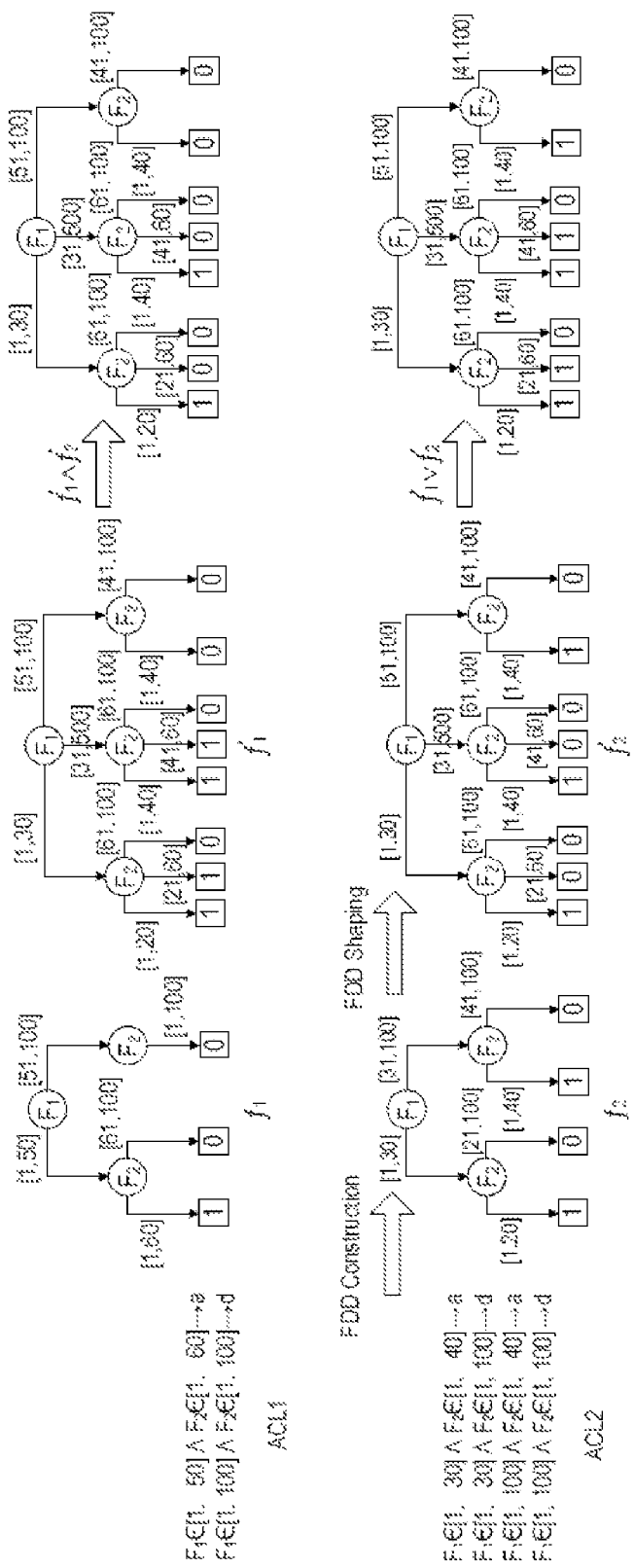
FIG. 3 is a diagram illustrating the method of FIG. 2 as applied to two exemplary ACLs.

With reference to FIGS. 2 and 3, a method for merging reachability sets is further described below. First, each ACL is converted at 22 to an equivalent Firewall Decision Diagram (FDD). FDD is a data structure for representing access control lists. A firewall decision diagram with a decision set DS and over fields $F_1, \ldots, F_d$ is an acyclic and directed graph that has the following five properties: (1) There is exactly one node that has no incoming edges. This node is called the root. The nodes that have no outgoing edges are called terminal nodes. (2) Each node v has a label, denoted F(v), such that $F(v) \in \{F_1, \ldots, F_d\}$ if v is a nonterminal node and F(v)∈DS if v is a terminal node. (3) Each edge e:u→v is labeled with a nonempty set of integers, denoted I(e), where I(e) is a subset of the domain of u's label (i.e., I(e)⊆D(F(u))). (4) A directed path from the root to a terminal node is called a decision path. No two nodes on a decision path have the same label. (5) The set of all outgoing edges of a node v, denoted E(v), satisfies the following two conditions: (i) Consistency: I(e)∩I(e')=∅ for any two distinct edges e and e' in E(v) and (ii) Completeness: $\cup_{e \in E(v)}$I(e)=D(F(v)). Further description for a firewall decision diagram may be found in "Structure firewall design" by M. G. Gouda and A. X. Liu, Computer Networks Journal, 51(4):1106-1120, 2007 and U.S. Pat. No. 7,818,793 which are herein incorporated by reference. An FDD construction algorithm, which converts a sequence of range rules to an equivalent full-length ordered FDD, is also described in "Diverse firewall design" by A. X. Liu and M. G. Gouda, In Proc. DSN, 2004. For computing reachability matrices, the protocol type field is chosen as the label of the root node. While the remainder of this disclosure makes reference to firewall decision diagrams, other types of diagrams are contemplated within the broader aspects of this disclosure.

As network reachability only concerns whether a packet is accepted or discarded, in this disclosure, it is sufficient to use only the FDDs whose DS={1,0}, where 1 represents accept and 0 represents discard. In converting an ACL to an equivalent binary FDD, all variants of accept are replaced, such as accept and accept with logging, by 1, and all variants of discard are replaced, such as discard, reject, and discard/reject with logging, by 0. A full-length ordered FDD is further defined as an FDD where in each decision path, all fields appear exactly once and in the same order. For ease of presentation, in the rest of this disclosure, the term "FDD" is used to mean "binary full-length ordered FDD" if not otherwise specified.

The decision paths whose terminal nodes are labeled 1 are called the accept paths. Similarly, the decision paths whose terminal nodes are labeled 0 are called the discard paths. Given an ACL l, after the ACL is converted it to an equivalent FDD f, the accept paths of f represent the set accept(l). That is, accept(l) is created by discarding paths from each firewall decision diagram having a terminal node with a discard value for the decision.

Next, each of the FDDs, $f_1$ and $f_2$, are converted at 24 to an equivalent FDDs, $f_1'$ and $f_2'$. More specifically, the two FDDs are semi-isomorphic if and only if they are exactly the same except the labels of their terminal nodes. The algorithm for equivalently converting two FDDs to two semi-isomorphic FDDs is described in "Diverse firewall design" by A. X. Liu and M. G. Gouda, IEEE TPDS, 19(8), 2008. FIG. 3 illustrates how to two FDDs are converted to two semi-isomorphic FDDs.

Lastly, the semi-isomorphic FDDs are merged at 26 to form a single diagram representing either the intersection or union of the semi-isographic FDDs. For any two semi-isomorphic FDDS $f_1'$ and $f_2'$, $f_1' \wedge f_2'$ results in a new FDD f such that f is semi-isomorphic to $f_1'$ (and $f_2'$) and a terminal node in f is labeled 1 if and only if the two corresponding nodes in $f_1'$ and $f_2'$ are both labeled 1 (otherwise is labeled 0). This implies that the accept paths of $f_1' \wedge f_2'$ is the intersection of the set of accept paths in $f_1'$ and that in $f_2'$. In other words, accept($l_1$)∩accept($l_2$) is calculated by applying a logical AND operation to the decisions at terminal nodes of any two semi-isomorphic FDDs $f_1'$ and $f_2'$.

Similarly, for any two semi-isomorphic FDDs $f_1'$ and $f_2'$, $f_1' \vee f_2'$ results in a new FDD f such that f is semi-isomorphic to $f_1'$ (and $f_2'$) and a terminal node in f is labeled 0 if and only if the two corresponding nodes in $f_1'$ and $f_2'$ are both labeled 0 (otherwise is labeled 1). This implies that the accept paths of $f_1' \wedge f_2'$ is the union of the set of accept paths in $f_1'$ and that in $f_2'$. In other words, $accept(l_1) \cup accept(l_2)$ is calculated by applying a logical OR operation to the decisions at terminal nodes of any two semi-isomorphic FDDs $f_1'$ and $f_2'$.

Note that after each FDD AND/OR operation, it is important to perform FDD reduction in order to bring down the FDD size expansion caused by the shaping procedure. An FDD is reduced if and only if it satisfies the following two conditions: (1) no two nodes are isomorphic; (2) no two nodes have more than one edge between them. Two nodes v and v' in an FDD are isomorphic if and only if v and v' satisfy one of the following two conditions: (1) both v and v' are terminal nodes with identical labels; (2) both v and v' are nonterminal nodes and there is a one-to-one correspondence between the outgoing edges of v and the outgoing edges of v' such that every pair of corresponding edges has identical labels and both edges point to the same node. An efficient FDD reduction algorithm is used that processes the nodes level by level from the terminal nodes to the root node using signatures to speed up comparisons. Applying FDD reduction is critical in reducing memory usage for computing network reachability.

Figure 4:
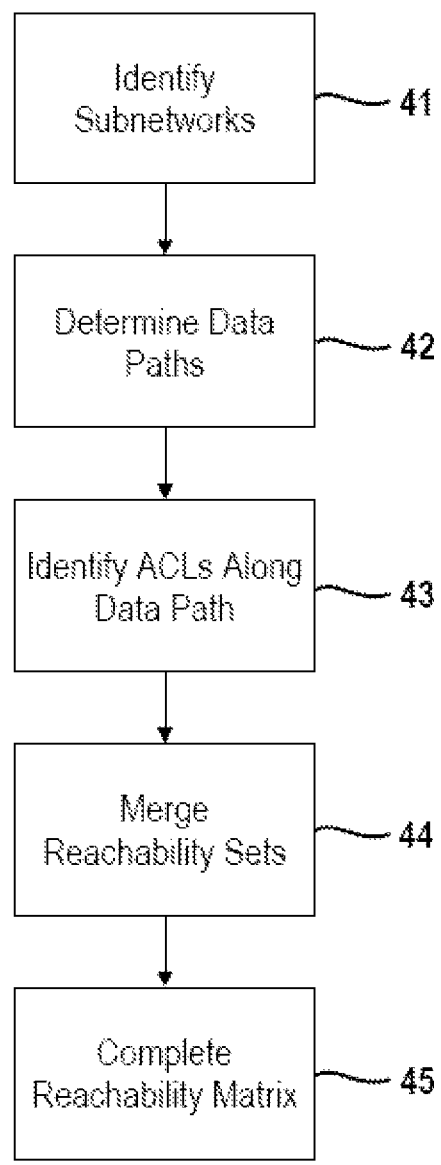
FIG. 4 is a flowchart depicting an exemplary method for computing network reachability in a computer network.

An exemplary method for computing network reachability in a computer network is further described in relation to FIG. 4. The method begins by identifying at 41 each of the subnetworks that comprise a computer network. While the exemplary method may be used to computer reachability for the entire network, it may also be applied to computer reachability between any arbitrary pair of subnetworks.

Two matrices serve as the starting point for computing network reachability, a path matrix and a FDD matrix. The path matrix P is an n×n matrix where each element P[i,j] is the set, of one-way paths from $N_i$ to $N_j$. For each path, access control lists along a given path are identified at 43 and a diagram that merges reachability sets derived from the access control lists along the given data path is computed at 44. Letting $l_1, \ldots, l_h$, be the ACLs along a given path, the FDD that represents $accept(l_1) \cap \ldots \cap accept(l_h)$ can be computed in the manner described above. The resulting FDDs are stored in the FDD matrix F, which is also an n×n matrix.

Matrices P and F are initialized as follows. For any $1 < i, j \leq n$, if there is path from $N_i$ to $N_j$ via a middlebox, then P[i, j] consists of this path (which is composed of two links: the link from $N_i$ to the middlebox and the link from the middlebox to $N_j$) and F[i, j] consists of the FDD that represent the intersection of the accept sets of the two ACLs associated with the two links; otherwise, P[i, j] and F[i, j] are both empty. Matrices P and F are then completed based on formulas (16) and (17) using dynamic programming. P[i,k]∘P[k, j] is used to denote the set of paths where each path is a concatenation of a path in P[i,k] and a path in P[k, j]. Similarly, F[i, k]∧F[k, j] is used to denote the set of FDDs where each FDD in F[k, j] to denote the set of FDDs where each FDD is the logical AND of an FDD in F[i, k] and an FDD in F[k, j]. Note that all paths with cycles are removed because cycles are typically prevented by routing protocols.

$$P[i, j] = \bigcup_{k \in N} P[i, k] \circ P[k, j] \quad (16)$$

$$F[i, j] = \bigcup_{k \in N} F[i, k] \wedge F[k, j] \quad (17)$$

For each FDD in F[i, j], the domain of the computed diagram is reduced to a set of network addresses used in the associated subnetworks. More specifically, the domain of the source IP address field is reduced to the set of IP addresses used in subnet $N_i$ and the domain of the destination IP address field is reduced to the set of IP addresses used in $N_j$. $src(N_i)$ is used to denote the set of packets whose source IP address is in $N_i$ and $dst(N_j)$ to denote the set of packets whose destination IP address is in $N_j$. $fdd(src(N_i))$ and $fdd(src(N_j))$ is used to denote the FDD that represents $dst(N_j)$. Therefore, each FDD f in F[i, j] is replaced by $fdd(src(N_i)) \wedge f \wedge fdd(dst(N_j))$.

Lastly, network reachability is represented as one of six matrices further described below. n denotes the number of subnets and z denotes the maximum number of paths between any pair of subnets. $A_{CL}^I\{1 \ldots n, 1 \ldots n, 1 \ldots z\}$ where each element $A_{CL}^I[i, j, k]$ is the set of packets representing the instantaneous reachability from $N_i$ to $N_j$ on the k-th path for connectionless protocols. For any $1 \leq k \leq |F[i, j]|$, $F[i,j]_k$ is used to denote the k-th FDD in F[i, j] and $P[i, j]_k$ to denote the k-th path in P[i, j]. $Sub_{CL}(F|i, j|_k)$ is used to denote the subtree of FDD $F[i, j]_k$ associated with a connectionless protocol (e.g., UDP). Recall that in computing reachability, the protocol type was chosen to be the label of the root node; otherwise, the diagrams may be sorted such that the root node of each diagram corresponds to the field in the network packets that specifies the type of network protocol. Therefore, the instantaneous reachability of the path $P[i, j]_k$ is:

$$A_{CL}^I[i,j,k] = Sub_{CL}(F[i,j]_k) \quad (18)$$

To extent that there is more than one subtree associated with a connectionless protocol, the identified subtrees are concatenated to form a single reachability diagram.

Accordingly, based on formulas (4) and (5), the reachability upper-bound and lower-bound from $N_i$ to $N_j$ are calculated as follows:

$$A_{CL}^U[i, j] = Sub_{CL}\left(\bigvee_{k=1}^{|F[i,j]|} F[i, j]_k\right) \quad (19)$$

$$A_{CL}^L[i, j] = Sub_{CL}\left(\bigwedge_{k=1}^{|F[i,j]|} F[i, j]_k\right) \quad (20)$$

With regard to connection-oriented protocols, first consider the case that all middleboxes on paths from $N_i$ to $N_j$ are stateful. $Sub_{CO}(F|i, j|_k)$ is used to denote the subtree associated with a connection-oriented protocol (e.g., TCP/ICMP). The instantaneous, upper-bound, and lower-bound reachability matrices are calculated using formulas (2), (6) and (7), as follows:

$$A_{CO}^I[i, j, k] = Sub_{CO}(F[i, j]_k) \quad (21)$$

$$A_{CO}^U[i, j] = Sub_{CO}\left(\bigvee_{k=1}^{|F[i,j]|} F[i, j]_k\right) \quad (22)$$

$$A_{CO}^L[i, j] = Sub_{CO}\left(\bigwedge_{k=1}^{|F[i,j]|} F[i, j]_k\right) \quad (23)$$

Second, consider the case that all middleboxes on paths from $N_i$ to $N_j$ are stateless. As discussed above, for the instantaneous reachability, the reachability of each data path $P[i, j]_k$ and the corresponding signaling path $P[i, j]_{k'}$ are examined. The swapping operator is implemented by function $Swap_{SD}$. For an FDD f, the function $Swap_{SD}(f)$ basically swaps the labels of source fields and destination fields. The instantaneous, upper-bound, and lower-bound reachability matrices are calculated using formulas (3), (6), and (7), as follows:

$$A_{CO}^I[i, j, k, k'] = Sub_{CO}(F[i, j]_k \wedge Swap_{SD}(F[j, i]_{k'})) \quad (24)$$

$$A_{CO}^U[i, j] = \bigvee_{k=1}^{|F[i,j]|} \bigvee_{k'=1}^{|F[j,i]|} A_{CO}^I[i, j, k, k'] \quad (25)$$

$$A_{CO}^L[i, j] = \bigwedge_{k=1}^{|F[i,j]|} \bigwedge_{k'=1}^{|F[j,i]|} A_{CO}^I[i, j, k, k'] \quad (26)$$

For the case that the paths from $N_i$ to $N_j$ contain both stateful and stateless middleboxes, we use the formulas (21), (22), and (23) to handle the stateful middleboxes and formulas (24), (25), and (26) to handle stateless middleboxes.

Algorithms for computing reachability for networks that have packet transformation filters are presented. There are two types of packet transformers, Net Address Translation (NAT) and Port Address Translation (PAT). The terms private subnet and private addresses refer respectively, to the source subnet and its address pool, which is behind NAT middlebox. Similarly, the terms public subnet and public addresses refer to the virtual subnet and its address pool after NAT transformer, respectively. There are two types of NAT transformation: Static NAT and Dynamic NAT. A static NAT uses a static one-to-one mapping from private addresses to public addresses. This mapping table is configured by network administrators. A dynamic NAT maps private addresses to public addresses on-the-fly randomly. In Port Address Translation (PAT), all private addresses are mapped to a single public IP address but with different source port numbers, where each port number is designated for a connection initiated from the private subnet. Port address assignment is random.

For handling packet transformers, assume that all paths from one subnet to another need to go through the same packet transformer. This assumption is purely for the ease of presentation, and it imposes no limitation on solutions for general cases. First, for paths that contain no packet transformers, reachability can be computed easily by combining the algorithms in this section and those described above. Second, the algorithms below can be easily extended to paths that contain more than one packet transformers by dividing each path into multiple chunks where each chunk contains only one packet transformer.

To handle static NAT, the algorithm only needs to change for computing an FDD matrix as follows. Given the k-th path from $N_i$ to $N_j$, which contains a static NAT that maps addresses in $N_i$ to $N'_i$, the path from $N_i$ to the NAT middlebox is called a private subpath and the path from the NAT middlebox to $N_j$ is called a public subpath. Let fr and fu be the FDDs that represent the set of packets that can be accepted by the ACLs on the private subpath and those on the public subpath respectively. Ts is used to denote the packet transformation function of the static NAT. Therefore, $src(N_i) \wedge fr \wedge dst(N_j)$ represents the packets that can traverse on the private subpath with source addresses in $N_i$, and $src(N'_i) \wedge fu \wedge dst(N_j)$ represents the packets that can traverse on the public subpath with source addresses in $N'_i$. Based on formula (8), the set of packets that can traverse from $N_i$ to $N_j$ passing the NAT can be calculated as follows:

$$F[i,j]_k = (src(N_i) \wedge fr \wedge dst(N_j)) \wedge T_S^{-1}(src(N'_i) \wedge fu \wedge dst(N_j)) \quad (27)$$

After this, reachability matrices can be computed using formulas (18), (19), and (20). Note that the operation $T_S^{-1}(src(N'_i) \wedge fu \wedge dst(N_j))$ basically replaces every source IP address x' in the domain of $N'_i$ to x in the domain of $N_i$ for FDD $src(N'_k) \wedge fu \wedge dst(N_j)$.

Unlike in static NAT, an address x' in $N'_i$ only when x initiates a connection. Thus, the $T_S$ function in dynamic NAT is not well defined. When a path contains a dynamic NAT transformer, computing the instantaneous reachability of the path is not feasible. Furthermore, the reachability bounds need to be formulated over both routing states and dynamic network address transformation. Therefore, the reachability upper-bound from $N_i$ to $N_j$ in a network with dynamic NAT is defined as the set of packets that can traverse from $N_i$ to $N_j$ under a viable routing state and a NAT transformation. The reachability lower-bound from $N_i$ to $N_j$ in a network with dynamic NAT is defined as the set of packets that can traverse from $N_i$ to $N_j$ under all routing states and all feasible NAT transformations.

Next, solutions are presented to compute reachability bounds for networks with dynamic NATs based on the above new definitions. Consider all the paths from $N_i$ to $N_j$, which all pass through a dynamic NAT. Let FDDs $fr_k$ and $fu_k$ represent all the accepted packets by the k-th private and public subpaths respectively, and let a and b be the total number of private and public subpaths respectively. The upper-bound reachability of the private subpaths and public subpaths are calculated as follows:

$$fr^U = \bigvee_{k=1}^{a} (src(N_i) \wedge fr_k \wedge dst(N_j))$$

$$fu^U = \bigvee_{k=1}^{b} (src(N'_i) \wedge fu_k \wedge dst(N_j))$$

Similarly, lower-bound reachability of the private subpaths and public subpaths are calculated as follows:

$$fr^L = \bigwedge_{k=1}^{a} (src(N_i) \wedge fr_k \wedge dst(N_j))$$

$$fu^L = \bigwedge_{k=1}^{b} (src(N'_i) \wedge fu_k \wedge dst(N_j))$$

Next, compute the reachability bounds from $N_i$ to $N_j$ using $fr^U$, $fr^U$, $fr^L$, $fu^L$. First, we need to reorder the fields of FDDs $fu^U$ and $fu^L$ such that the label of the root is the source IP address. Because a dynamic NAT may map an address in $N_i$ to any address in $N'_i$, to compute the reachability upper-bound from $N_i$ to $N_j$, we need to disregard the source IP address field in $fu^U$ by applying the logic OR operation on all the subtrees of the root. Thus, the upper-bound reachability for paths that contain a Dynamic NAT transformer is as follows:

$$A_{CL}^U[i,j] = Sub_{CL}(fr^U \wedge \bigvee (\text{all subtrees of the root of } fu^U)) \quad (28)$$

Similarly, to compute the reachability lower-bound from $N_i$ to $N_j$, we need to disregard the source IP address filed in $fu^L$ by applying the logical AND operation on all the paths that contains a Dynamic NAT transformer is below:

$$A_{CL}^L[i,j] = Sub_{CL}(fr^L \wedge \bigwedge \text{(all subtrees of the root of } fu^L)) \quad (29)$$

Note that reordering the packet fields of an FDD f can be done in two steps. First, generate an equivalent ACL 1 from f. Second, construct an equivalent FDD f' from l using the new packet field order.

For simplicity, assume that a dynamic NAT transformer only changes the source IP address of a packet and does not change the source port field. However, even if it is the case, the solution can easily adapt by excluding both fields from the FDDs $fu^U$ and $fu^L$.

In port addresses translation, the public addresses ($N_i$) consists of a single IP address. Similar to dynamic NAT, PAT dynamically assign port numbers to new connections. Therefore, for paths with PAT, the instantaneous reachability cannot be computed because the transformation function is not well-defined. However, we can define and compute reachability bounds for PAT similar to those for dynamic NAT. Formulas (28) and (29) are still valid except that we reorder the packet fields of the FDDs $fu^U$ and $fu^L$ such that the source port field is the label of the roots.

As we stated previously, for simplicity, solutions are presented to the case that all middleboxes on a path are stateful and the case that all middleboxes on a path are stateless. When all middleboxes on the path from $N_i$ to $N_j$ are stateful, for static NAT, the FDD matrix calculated by formula (27) and formulas (21), (22) and (23) are used to calculate the reachability matrices; for dynamic NAT, formulas (28) and (29) are used to calculate the reachability matrices except that the $Sub_{CL}$ function should be replaced by $Sub_{CO}$. Next, solutions are presented for the case that all middleboxes on a path are stateless based on the three types of packet transformers.

Considering the communication between $N_i$ and $N_j$ where all paths between them pass through a static NAT t, let $\vec{fr}$, $\vec{fu}$, $\overleftarrow{fr}$ be the FDDs that represent the packets that can traverse on the paths from $N_i$ to t, t to $N_j$, $N_j$ to t, and t to $N_i$, respectively. According to formula (27), the packets that can traverse on the path is represented by data $F[\vec{i,j}]_k = (src(N_i) \wedge \vec{fr} \wedge dst(N_j)) \wedge T_S^{-1}(src(N'_i) \wedge \vec{fu} \wedge dst(N_j))$. Similarly, the packets that can traverse on the signaling path are represented by $F[\overleftarrow{j,i}]_k = (src(N_j) \wedge \overleftarrow{fr} \wedge dst(N_i)) \wedge T_s(src(N_j) \wedge \overleftarrow{fu} \wedge dst(N'_i))$. Therefore, according to formula (24), the instantaneous reachability between $N_i$ and $N_j$ is computed as formula (30). The reachability bounds are calculated according to formulas (25) and (26).

$$A_{CO}^I[i,j,k,k'] = Sub_{CO}(\overrightarrow{F[i,j]}_k \wedge Swap_{SD}(\overleftarrow{F[j,i]}_{k'})) \quad (30)$$

As discussed above, the new definitions are used for computing readability bounds for networks with dynamic NAT. Let a and b be the total number of private and public paths respectively. For the reachability upper-bound of the data path from $N_i$ to $N_j$, first compute the reachability upper-bound for the private and public paths as follows:

$$\overrightarrow{fr^U} = \bigvee_{k=1}^{a} (src(N_i) \wedge \overrightarrow{fr_k} \wedge dst(N_j))$$

$$\overrightarrow{fu^U} = \bigvee_{k=1}^{b} (src(N'_i) \wedge \overrightarrow{fu_k} \wedge dst(N_j))$$

$$\overleftarrow{fr^U} = \bigvee_{k=1}^{a} (src(N_j) \wedge \overleftarrow{fr_k} \wedge dst(N_i))$$

$$\overleftarrow{fu^U} = \bigvee_{k=1}^{b} (src(N_j) \wedge \overleftarrow{fu_k} \wedge dst(N'_i))$$

Second, reorder the packet fields for the FDDs $\overrightarrow{fu^U}$ and $\overleftarrow{fu^v}$ such that the root of $\overrightarrow{fu^U}$ is labeled as the source IP address and the root of $\overleftarrow{fu^v}$ is labeled as the destination IP address. Third, compute the reachability upper-bound as:

$$A_{CO}^U[i,j] = Sub_{CO}(\overrightarrow{fr^U} \wedge \bigvee \text{(all subtrees of the root of } \overrightarrow{fu^U})) \wedge \quad (31)$$
$$Swap_{SD}(\overleftarrow{fr^U} \wedge \bigvee \text{(all subtrees of the root of } \overleftarrow{fu^U})))$$

For reachability lower bound, first computer $\overrightarrow{fr^L}$, $\overrightarrow{fu^L}$, $\overleftarrow{fr^L}$, and $\overleftarrow{fu^L}$ as above by replacing all logic OR with Logical AND. Then, compute the lower-bound as follows:

$$A_{CO}^L[i,j] = Sub_{CO}(\overrightarrow{fr^L} \wedge \bigwedge \text{(all subtrees of the root of } \overrightarrow{fu^L})) \wedge \quad (32)$$
$$Swap_{SD}(\overleftarrow{fr^L} \wedge \bigwedge \text{(all subtrees of the root of } \overleftarrow{fu^L})))$$

For PAT, define and compute reachability bounds similar to those for dynamic NAT. Formulas (31) and (32) are still valid except that reorder the packet fields of the FDDs $\overrightarrow{fu^U}$ and $\overrightarrow{fu^L}$ such that the root is labeled the source port field and reorder the packet fields in $\overleftarrow{fu^v}$ and $\overleftarrow{fu^L}$ such that the root is labeled the destination port field.

After reachability matrices are calculated, they can be used as the engine for efficiently processing network reachability queries. Languages for specifying reachability queries, ways of using such queries for network and security management, and algorithms for processing these queries are presented below. Based on the nature of queries, Quarnet supports three types of queries: upper-bound, lower-bound, and instantaneous. Upper-bound/lower-bound reachability queries are useful in verifying whether the ACLs on middleboxes satisfy certain security policies. Instantaneous reachability queries are useful for real-time security monitoring as the administrator identifies which paths are used at the time of querying. Such queries are also useful to verify whether the changes on the ACLs on some middleboxes have undesired impact on reachability. Based on the answer of queries, Quarnet supports two types of queries: closed and open. The closed queries that demands an answer of yes/no. For instance, considering the network in FIG. 1, can all hosts in S1 communicate with Mail Serve in S4 on TCP port 25 via any path? The open queries that demands an answer of a set. For example, which hosts in S1 can access the Mail Server in S4 on TCP port 25 via any path from S1 to S4? As another example, what set of paths may let all hosts in S1 access the Mail Server in S4 on TCP port 25?

In an exemplary embodiment, define an SQL-like language called Structured Reachability Query Language (SRQL) for specifying reachability queries. SRQL has the following format:

```
reachability_type 𝒯
connection_type 𝒪
select ℱ
where (F₁ ∈ S₁) ∧ ··· ∧ (F_d ∈ S_d) ∧ (𝒫 ∈ S_P)
```

The reachability type $\mathcal{T}$ denotes the type of reachability, namely instantaneous (I), upper-bound (U), or lower-bound (L). The connection $\mathcal{O}$ denotes the connection orientation of transport protocols, namely connection-oriented (CO) or connectionless (CL). When the reachability type $\mathcal{T}$ is upper-bound or lower-bound, the select clause $\mathcal{F}$ is a subsection of packet fields $\{F_1, F_2, \ldots, F_d, P\}$ where P denotes the attribute of "path". In the where clause, the predicate $(F_1 \epsilon S_1) \wedge \ldots \wedge (F_d \epsilon S_d)$ specifies the set of packets that this query is concerned with and $(P \epsilon S_p)$ specifies the set of paths that this query concerns.

Administrators may not be expected to specify queries using SRQL directly. Instead, a full-fledged implementation of Quarnet to provide a GUI interface for inputting queries and specifying paths. The SRQL will be used to formally represent a query under the hood.

The result of an upper-bound reachability query, where $F=\{F_1, \ldots, F_h\}$ and $F_i \epsilon \{F_1, F_2, \ldots, F_d\}$ for every $1 \leq i \leq h$, is defined as follows:

$$\{(\pi_{\mathcal{F}_1}, \ldots, \pi_{\mathcal{F}_h}) \mid (\pi_1 \in S_1) \wedge \ldots \wedge (\pi_d \in S_d) \text{ and packet } (\pi_1, \ldots, \pi_d)$$

can traverse from its source to its destination at some time}

The result of a lower-bound query is defined similarly except that "at some time" is replaced by "at any time".

The result of an instantaneous reachability query, where $F=\{F_1, \ldots, F_h, P\}$ and $F_i \epsilon \{F_1, F_2, \ldots, F_d\}$ for every $1 \leq i \leq h$, is defined as follows:

$$\{(\pi_{\mathcal{F}_1}, \ldots, \pi_{\mathcal{F}_h}, \rho) \mid$$

$(\pi_1 \in S_1) \wedge \ldots \wedge (\pi_d \in S_d)$ and packet $(\pi_1, \ldots, \pi_d)$ can traverse from its source to its destination through path $\rho$ where $\rho \in S_P$.}

Some example queries are presented using the shorthand S for source IP, D for destination IP, SP for source port, DP for destination port, and PT for protocol type. The question "Do all hosts in S1 can communicate with the mail server in S4 on TCP port 25?" can be formulated as the following query:

```
type L
protocol CO
select S
where (S ∈ S1) ∧ (D ∈ MailServer) ∧ (DP ∈ 25) ∧ (PT ∈ TCP)
```

If the query result is all the IP addresses in S1, then the answer is "yes"; otherwise the answer is "no".

In an example, SRQL query for the question "Through what paths the mail server in S4 on TCP port 25 is accessible from S1?" is the following:

```
type I
protocol CO
select 𝒫
where (S ∈ S1) ∧ (D ∈ MailServer) ∧ (DP ∈ 25) ∧ (PT ∈ TCP)
```

In yet another example, the answer to some questions may be the union or intersection of multiple SRQL query results. For example, the answer for the question "Which hosts in S1 can access the Mail Server in S4 on both UDP and TCP port 25 via any path from S1 to S4?" the intersection of the results of the following two SRQL queries:

```
type L
protocol CO
select S
where (S ∈ S1) ∧ (D ∈ MailServer) ∧ (DP ∈ 25) ∧ (PT ∈ TCP)
type L
protocol CL
select S
where (S ∈ S1) ∧ (D ∈ MailServer) ∧ (DP ∈ 25) ∧ (PT ∈ UDP)
```

An exemplary reachability query engine consists of six FDDs representing the six reachability matrices, respectively. The six FDDs are computed as follows. For each of the four upper-bound/lower-bound reachability matrices, apply the logical OR operation to all matrix elements, where each element is an FDD representing the reachability between two specific subnets. The resultant FDD over d fields represents the upper-bound/lower-bound reachability between any two subnets. For each of the two instantaneous reachability matrices, compute the two corresponding FDDs as follows. First, reduce the two instantaneous reachability matrices to 2-dimensional matrices by combining the FDDs for the various paths from a source to a destination into on FDD. To achieve this, first add a new node labeled with a new attribute "path" to each FDD as the root whose outgoing edge is labeled with path IDs, and then apply the logical OR operation to all FDDs regarding the reachability from one subnet to another. It is trivial to label every path with a unique ID. Second, for each of the two resultant 2-dimensional matrices, apply the logical OR operation to all elements and get an FDD over d−1 fields. The six FDDs will be used to process SRQL queries.

Reachability queries can be quickly processed by traversing one of the six FDDs computed above. The algorithm is essentially the same as the one described in by A. X. Liu et al. in "Firewall Queries" In Proc. OPODIS, 2004 for querying one firewall policy. It is readily understood that other query languages and arrangements to implement a query engine.

Some middleboxes (such as Cisco PIX firewalls and Sidewinder Firewalls) allow administrators to specify rules accepting or discarding all packets coming in from one interface and forwarded to another interface. Such rules, unlike ACL rules specified over packet header fields, can be easily handled by Quarnet. If ACL rules have higher priority over interface rules, which is the case for PIX firewalls, then the interface rules can be modeled as the default rule in the two ACLs. For example, an interface rule discarding all packets from incoming interface int1 to outgoing interface int2 essentially specifies that the default rule in the ACLs guarding int1 and int2 are all discard. If interface rules have higher priority over ACL rules, such interface rules can be easily handled by Quarnet in the FDD matrix initialization phase described above. Recall that in this phase, first calculate the FDDs for one-hop paths. For a one-hop path connected by one middlebox and two links, one connected to an incoming interface of the middlebox, if there is an accept interface rule for the two interfaces, we simply model the FDD as one accepting all packets; if there is a discard interface rule for the two interfaces, simply model the FDD as one discarding all packets.

For a given network, let n be the number of subnets, m be the number of middleboxes, h be the maximum number of interfaces on a middlebox, p be the number of the paths in the network, g be the maximum of number of rules in an ACL, and d be the number of fields in each rule. Note that d is typically a constant, which is 4 or 5 for IP networks.

The complexity of constructing the equivalent FDD from an ACL with g d-dimensional rules is $O(g^d)$. The complexity of shaping the two FDDs constructed from two ACLs is $O((2g)^d)=O(g^d)$. Therefore, the complexity of computing reachability matrices is $O(p \cdot g^d)$.

In theory, the total number of paths p is much smaller than its theoretical upper-bound because networks are typically designed following the hierarchical network design model. Using this model, a network is designed in three layers, namely a core layer, a distribution layer, and an access layer. Security policies are mostly applied on the distribution layer, and the core layer is mainly used to facilitate routing between subnets. For networks designed by this model, the number of paths between two subnets is typically small (often one), and the length of a path is typically small.

As a network evolves over time, there is a need to update reachability matrices accordingly. There are three types of network changes that will affect reachability matrices: topology changes, configuration changes, and ACL changes.

Any modification to the physical structure of a network, such as adding/removing a link, leads to network topology change. When such changes happen, the path matrix needs to be recomputed. For the new paths in the new path matrix, there is also a need to recompute the corresponding elements in the FDD matrix F. The reachability matrices need to be updated accordingly.

Network configuration changes refer to the changes in the subnet addresses or subnet masks. For such changes, the third step in computing the FDD matrix needs to be performed for the paths whose beginning or ending subnets are changed.

ACL changes refer to the changes on ACL rules. When an ACL on a link changes, for all the paths that contains the link, there is a need to recompute the corresponding element in the FDD matrix.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for computing network reachability between a pair of subnetworks in a computer network, comprising:
   determining data paths between a first subnetwork of interest in the computer network and a second subnetwork of interest in the computer network;
   identifying, for a given data path, two or more access control lists implemented along the given data path, where each access control list is a set of rules for filtering network packets and each rule in the set of rules sets forth values for fields in a network packet and a decision for packets having matching field values;
   representing each of the access control lists in the given data path as a different diagram, thereby yielding a plurality of diagrams;
   reducing domain for each diagram in the plurality of diagrams to a set of network addresses used in the first subnetwork and the second subnetwork;
   merging the plurality of diagrams into a merged diagram by applying a logical AND operation to the decisions at terminals nodes of the plurality of diagrams, where the merged diagram represents an intersection between the access control lists in the given data path;
   deriving a set of network packets that traverse from the first subnetwork to the second subnetwork from the merged diagram; and
   computing instantaneous reachability from the first subnetwork to a second subnetwork for connectionless protocols on a given data path by
   sorting the merged diagram associated with the given data path such that a root node of the merged diagram corresponds to a field in the network packets that specifies type of network protocol;
   identifying subtrees in the sorted diagram that are associated with connectionless protocols;
   forming a reachability diagram from the identified subtrees; and
   deriving from the reachability diagram a set of network packets that traverse from the first subnetwork to the second subnetwork, wherein each step is implemented by processor-executable instructions executed by a computer processor.

2. The method of claim 1 further comprises:
   representing each of the access control lists in the given data path as a firewall decision diagram;
   converting each of the firewall decision diagrams to an equivalent firewall decision diagram, where the equivalent firewall decision diagrams are semi-isomorphic; and
   forming the merged diagram by applying a logical AND operation to the decisions at terminals nodes of the equivalent firewall decision diagrams.

3. The method of claim 2 further comprises discarding paths from each firewall decision diagram having a terminal node with a discard value for the decision.

4. The method of claim 2 wherein a firewall decision diagram is further defined as an acyclic and directed graph having the following properties: a root node that has no incoming edges and terminal nodes that have no outgoing edges; each node v has a label, denoted F(v), such that $F(v) \in \{F_1, \ldots, F_d\}$ if v is a nonterminal node and $F(v) \in DS$ if v is a terminal node; each edge $e: u \rightarrow v$ is labeled with a nonempty set of integers, denoted I(e), where I(e) is a subset of the domain of u's label; a directed path from the root to a terminal node is called a decision path and no two nodes on a decision path have the same label; and the set of all outgoing edges of a node v, denoted E(v), satisfies $I(e) \cap I(e') = \emptyset$ for any two distinct edges e and e' in E(v) and $\cup_{e \in E(v)} I(e) = D(F(v))$.

5. The method of claim 1 further comprises computing lower-bound reachability from the first subnetwork to the second subnetwork for connectionless protocols by intersecting the plurality of reachability diagrams by applying a logical AND operation to the decisions at terminals nodes of the plurality of reachability diagrams.

6. The method of claim 1 further comprises computing an upper-bound reachability from the first subnetwork to the second subnetwork for connectionless protocols by merging the plurality of reachability diagrams by applying a logical OR operation to the decisions at terminals nodes of the plurality of reachability diagrams.

7. The method of claim 1 further comprises computing instantaneous reachability from the first subnetwork to a second subnetwork for connection-oriented protocols on a given data path by
sorting the merged diagram associated with the given data path such that a root node of the merged diagram corresponds to a field in the network packets that specifies type of network protocol;
identifying subtrees in the sorted diagram that are associated with connection-oriented protocols;
forming a reachability diagram from the identified subtrees; and
deriving from the reachability diagram a set of network packets that traverse from the first subnetwork to the second subnetwork.

8. The method of claim 7 further comprises computing lower-bound reachability from the first subnetwork to the second subnetwork for connection-oriented protocols by intersecting the plurality of reachability diagrams by applying a logical AND operation to the decisions at terminals nodes of the plurality of reachability diagrams.

9. The method of claim 7 further comprises computing an upper-bound reachability from the first subnetwork to the second subnetwork for connection-oriented protocols by merging the plurality of reachability diagrams by applying a logical OR operation to the decisions at terminals nodes of the plurality of reachability diagrams.

10. A method for computing network reachability in a computer network having a plurality of subnetworks, comprising:
identifying each of the subnetworks that comprise a computer network;
determining, for each pair of subnetworks, data paths between two subnetworks that comprise a given pair of subnetworks;
identifying, for each identified data path, two or more access control lists implemented along a given data path, where each access control list is a set of rules for filtering network packets and each rule in the set of rules sets forth values for fields in a network packet and a decision for packets having matching field values;
representing each of the identified access control lists in the given data path as a different diagram, thereby yielding a plurality of diagrams;
merging the plurality of diagrams into a merged diagram, where the merged diagram represents an intersection between the access control lists in the given data path; and
reducing, for each pair of subnetworks, domain of the computed diagrams associated with a given pair of subnetworks to a set of network addresses used in the given pair of subnetworks;
computing instantaneous reachability for a given pair of subnetworks for connection-oriented protocols on a given data path having stateful middleboxes by
sorting the merged diagram associated with the given data path such that a root node of the merged diagram corresponds to a field in the network packets that specifies type of network protocol;
identifying subtrees in the sorted diagram that are associated with connection-oriented protocols;
forming a reachability diagram from the identified subtrees; and
deriving from the reachability diagram a set of network packets that traverse between the given pair of subnetworks, wherein each step is implemented by processor-executable instructions executed by a computer processor.

11. The method of claim 10 further comprises determining data paths in the computer network using dynamic programming.

12. The method of claim 10 wherein merging the diagrams further comprises:
representing each of the access control lists in the given data path as a firewall decision diagram;
converting each of the firewall decision diagrams to an equivalent firewall decision diagram, where the equivalent firewall decision diagrams are semi-isomorphic; and
forming a diagram that represents an intersection between the access control lists in the given data path by applying at least one of a logical AND operation to the decisions at terminals nodes of the equivalent firewall decision diagrams.

13. The method of claim 12 further comprises discarding paths from each firewall decision diagram having a terminal node with a discard value for the decision.

14. The method of claim 12 wherein a firewall decision diagram is further defined as an acyclic and directed graph having the following properties: a root node that has no incoming edges and terminal nodes that have no outgoing edges; each node v has a label, denoted $F(v)$, such that $F(v) \in \{F_1, \ldots, F_d\}$ if v is a nonterminal node and $F(v) \in DS$ if v is a terminal node; each edge $e:u \rightarrow v$ is labeled with a nonempty set of integers, denoted $I(e)$, where $I(e)$ is a subset of the domain of u's label; a directed path from the root to a terminal node is called a decision path and no two nodes on a decision path have the same label; and the set of all outgoing edges of a node v, denoted $E(v)$, satisfies $I(e) \cap I(e') = \emptyset$ for any two distinct edges e and e' in $E(v)$ and $\cup_{e \in E(v)} I(e) = D(F(v))$.

15. The method of claim 10 further comprises computing instantaneous reachability for a given pair of subnetworks for connectionless protocols by
sorting the merged diagram associated with the given pair of subnetworks such that a root node of the merged diagram corresponds to a field in the network packets that specifies type of network protocol;
identifying subtrees in the sorted diagram that are associated with connectionless protocols;
forming a reachability diagram from the identified subtrees; and
deriving from the reachability diagrams associated with a given pair of subnetworks a set of network packets that traverse between subnetworks that comprise the given pair of subnetworks.

16. The method of claim 15 further comprises computing lower-bound reachability for a given pair of subnetworks by intersecting the reachability diagrams associated with the given pair of subnetworks by applying a logical AND operation to the decisions at terminals nodes of the plurality of reachability diagrams.

17. The method of claim 15 further comprises computing an upper-bound reachability for a given pair of subnetworks by intersecting the reachability diagrams associated with the given pair of subnetworks by applying a logical OR operation to the decisions at terminals nodes of the plurality of reachability diagrams.

18. The method of claim 10 further comprises computing lower-bound reachability for a given pair of subnetworks by intersecting the reachability diagrams associated with the given pair of subnetworks by applying a logical AND operation to the decisions at terminals nodes of the plurality of reachability diagrams.

19. The method of claim 10 further comprises computing an upper-bound reachability for a given pair of subnetworks by intersecting the reachability diagrams associated with the given pair of subnetworks by applying a logical OR operation to the decisions at terminals nodes of the plurality of reachability diagrams.

20. The method of claim 10 further comprises computing instantaneous reachability for a given pair of subnetworks for connection-oriented protocols on a given data path having stateless middleboxes by
   swapping labels for fields in the network packets that specify source network address and destination network address for the reduced diagram for a corresponding signaling path associated with the given data path to form a swapped diagram;
   intersecting the reduced diagram associated with the given data path with the swapped diagram by applying a logical AND operation to the decisions at terminal nodes of the diagrams to form an intersecting diagram;
   sorting the intersecting diagram such that a root node of the reduced diagram corresponds to a field in the network packets that specifies type of network protocol;
   identifying subtrees in the sorted diagram that are associated with connection-oriented protocols;
   forming a reachability diagram from the identified subtrees; and
   deriving from the reachability diagram a set of network packets that traverse from the first subnetwork to the second subnetwork.

21. The method of claim 10 further comprises computing a diagram that merges reachability sets derived from the access control lists along a given data path having a static network address translator by
   computing a first diagram that merges reachability sets derived from the access control lists between a source of the given data path and the network address translator;
   computing a second diagram that merges reachability sets derived from the access control lists between the network address translator and a destination of the given data path;
   determining a packet transformation function for the network address translator and applying an inverse of the packet transformation function to the second diagram; and
   intersecting the first diagram with the second diagram by applying a logical AND operation to the decisions at terminal nodes of the first and second diagrams.

22. The method of claim 21 further comprises computing instantaneous reachability for a dynamic network translator by determining a packet transformation function for the network address translator at a given time.

23. The method of claim 21 further comprises computing a lower-bound reachability for a dynamic network address translator by
   sorting the second diagram such that a root node of the second diagram corresponds to a field in the network packets that specifies a source address;
   applying a logical AND operation to the subtrees of the sorted diagram to form another diagram;
   intersecting the first diagram with the another diagram by applying a logical AND operation to the decisions at terminal nodes of the first diagram and the another diagram.

24. The method of claim 21 further comprises computing an upper-bound reachability for a dynamic network address translator by
   sorting the second diagram such that a root node of the second diagram corresponds to a field in the network packets that specifies a source address;
   applying a logical OR operation to the subtrees of the sorted diagram to form another diagram;
   intersecting the first diagram with the another diagram by applying a logical AND operation to the decisions at terminal nodes of the first diagram and the another diagram.

25. The method of claim 10 further comprises configuring an access control list in the computer network the set of network addresses used in the given pair of subnetworks.

26. A computer program for computing network reachability in a computer network having a plurality of subnetworks, the computer program embodied on a non-transitory tangible computer medium and executable by a computer processor to perform the steps comprising:
   identifying each of the subnetworks that comprise a computer network;
   determining, for each pair of subnetworks, data paths between two subnetworks that comprise a given pair of subnetworks;
   identifying, for each identified data path, two or more access control lists implemented along a given data path, where each access control list is a set of rules for filtering network packets and each rule in the set of rules sets forth values for fields in a network packet and a decision for packets having matching field values;
   representing each of the access control lists in the given data path as a different diagram, thereby yielding a plurality of diagrams;
   reducing, for each pair of subnetworks, domain of diagrams associated with a given pair of subnetworks in the plurality of diagrams to a set of network addresses used in the given pair of subnetworks;
   merging the computed diagrams into a merged diagram by applying a logical AND operation to the decisions at terminals nodes of the diagrams, where the merged diagram represents an intersection between the access control lists in the given data path;
   computing instantaneous reachability from a first subnetwork to a second subnetwork for connectionless protocols on the given data path by
   sorting the merged diagram associated with the given data path such that a root node of the merged diagram corresponds to a field in the network packets that specifies type of network protocol;
   identifying subtrees in the sorted diagram that are associated with connectionless protocols;
   forming a reachability diagram from the identified subtrees; and
   deriving from the reachability diagram a set of network packets that traverse from the first subnetwork to the second subnetwork.

* * * * *